United States Patent [19]

Le Sergent et al.

[11] Patent Number: 5,090,979

[45] Date of Patent: Feb. 25, 1992

[54] METHOD OF MANUFACTURING AN OPTICAL FIBER PREFORM HAVING DOPED CLADDING

[75] Inventors: Christian Le Sergent, Marconisions; Josiane Ramos, Bondoulfe, both of France

[73] Assignee: Compagnie Generale d'Electricite, Paris, France

[21] Appl. No.: 561,757

[22] Filed: Aug. 2, 1990

[30] Foreign Application Priority Data

Aug. 2, 1989 [FR] France .............. 89 10420

[51] Int. Cl.$^5$ ............................................. C03C 25/02
[52] U.S. Cl. ........................... 65/3.12; 15/DIG. 16; 15/18.3; 385/127
[58] Field of Search .................. 65/3.11, 3.12, 3.2, 65/18.1, 18.3, 60.8, DIG. 16; 350/96.33

[56] References Cited

U.S. PATENT DOCUMENTS

| | | | |
|---|---|---|---|
| 4,199,337 | 4/1980 | Asam | 65/31 |
| 4,230,396 | 10/1980 | Olshansky et al. | 65/3.11 |
| 4,385,802 | 5/1983 | Blaszyk et al. | 350/96.33 |
| 4,435,040 | 3/1984 | Cohen et al. | 350/96.33 |
| 4,579,571 | 4/1986 | Hicks | 65/DIG. 16 |
| 4,822,136 | 4/1989 | Hicks | 350/96.34 |

FOREIGN PATENT DOCUMENTS

| | | |
|---|---|---|
| 0041864 | 12/1981 | European Pat. Off. . |
| 0061901 | 10/1982 | European Pat. Off. . |
| 0185975 | 7/1986 | European Pat. Off. . |
| 0191202 | 8/1986 | European Pat. Off. . |
| 0283748 | 9/1988 | European Pat. Off. . |
| 0309027 | 3/1989 | European Pat. Off. . |
| 3040363 | 5/1981 | Fed. Rep. of Germany . |
| 2438017 | 4/1980 | France . |
| 2512215 | 3/1983 | France . |
| 8604689 | 8/1986 | PCT Int'l Appl. . |
| 2032910 | 5/1980 | United Kingdom . |

Primary Examiner—Richard V. Fisher
Assistant Examiner—John J. Bruckner
Attorney, Agent, or Firm—Sughrue, Mion, Zinn, Macpeak & Seas

[57] ABSTRACT

According to the present invention, a preform (7) for an optical fiber is made from a tube having a substrate layer (16) of fluorine-doped silica and a support layer (18) of non-doped silica. A cladding layer (8) of fluorine-doped silica and a core layer (10) of non-doped silica are formed on the inside surface of the tube by chemical vapor phase deposition. The optical fiber is subsequently obtained by collapsing the tube and drawing it. The invention is applicable to fabricating optical fibers.

4 Claims, 1 Drawing Sheet

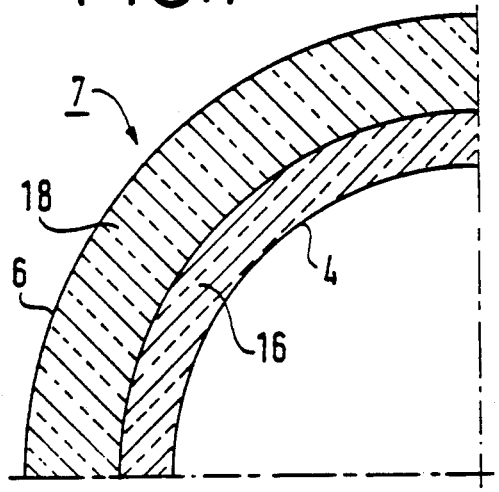
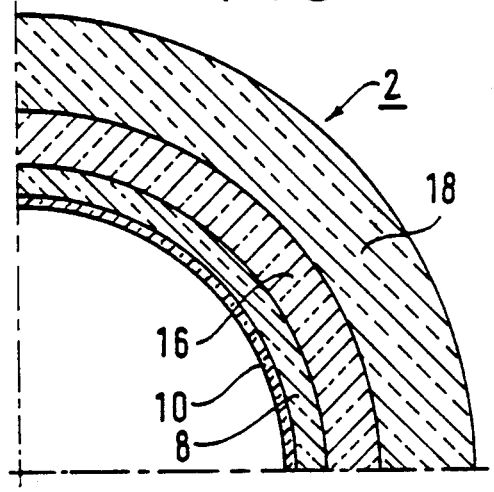
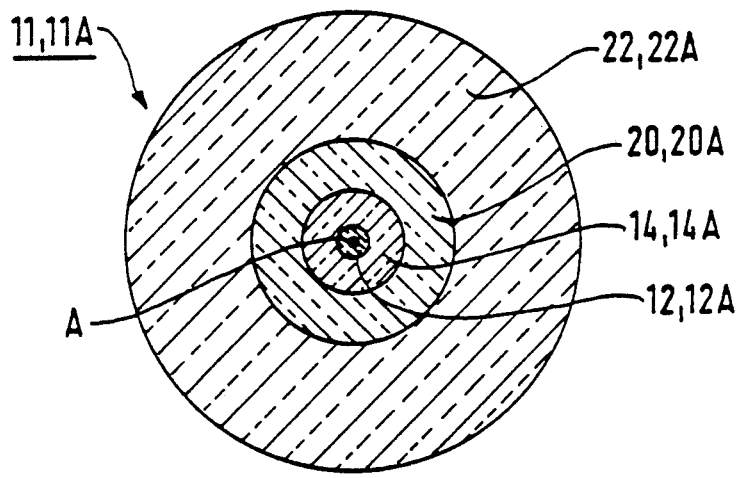
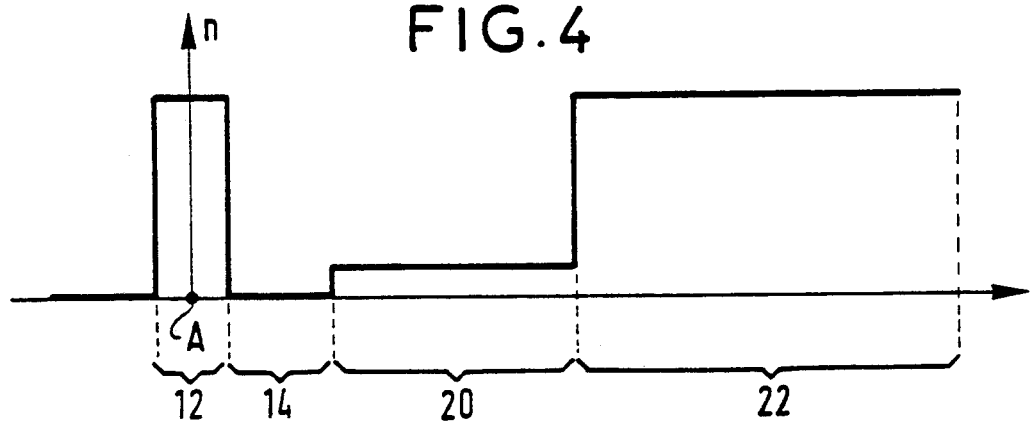

METHOD OF MANUFACTURING AN OPTICAL FIBER PREFORM HAVING DOPED CLADDING

The present invention relates to optical fibers.

Amongst known optical fibers, those having the lowest light losses are known as "silica-core" fibers. The core is constituted by silica having little or no doping. The optical cladding is constituted by silica doped with fluorine to a concentration that causes a drop in refractive index lying in the range about $4 \times 10^{-3}$ to $6 \times 10^{-3}$.

The fibers are hot drawn from preforms. Preforms are fabricated by performing chemical vapor deposition inside substrate tubes using methods known under the initials CVD, MCVD, PCVD, PMCVD, SPCVD, etc. ..., and then by subjecting the tubular performs obtained in this way to collapsing operations.

The fibers resulting therefrom comprise:

a high-index core (i.e. having a refractive index which is relatively high, said index being generally substantially the same as that of pure silica);

low-index cladding (i.e. having a refractive index reduced by the silica being doped, generally with fluorine); and a high-index outer layer (i.e. having a refractive index close to that of the core.

The presence of such an outer layer gives rise to the leakage of light which propagates in the mode guided by the fiber, i.e. it causes a loss of useful light. Two remedies have been proposed for avoiding such loss. One consists in increasing the ratio of the thickness of the optical cladding to the radius of the core. However this increases the cost of fabricating the preform. The other proposed remedy is to ensure maximum confinement for a cutoff wavelength which is as long as possible. However this increases time dispersion and reduces the transmission window of the fiber, i.e. the range of light wavelengths over which the fiber provides effective transmission.

A particular object of the present invention is to use a different remedy for avoiding the above-mentioned light loss. The present invention provides a method of fabricating an optical fiber having doped cladding, the method comprising the following operations for forming a final fiber;

fabricating a silica-based substrate tube comprising a tubular substrate layer constituted by substrate silica which is doped with a doping material for reducing its refractive index so as to avoid light losses in said final fiber;

depositing a tubular cladding layer on the inside surface of said substrate tube, said cladding layer being constituted by cladding silica which is doped with a doping material that reduces its refractive index so that said cladding layer gives rise subsequently to optical cladding of said final fiber, said doping material simultaneously reducing the softening temperature of the silica, said deposition operation being performed at a temperature close to the softening temperature of the layer;

depositing a tubular core layer on said tubular cladding layer to form a tubular perform, said core layer being constituted by core silica which is not doped or which is doped less than said cladding silica so as to give rise subsequently to a core of said final fiber;

hot collapsing said tubular preform to form a solid collapsed preform comprising a collapsed substrate layer, a collapsed cladding layer, and a preform core derived from said tubular substrate layer, from said tubular cladding layer, and from said tubular core layer; and hot drawing said collapsed preform to form said final fiber, the method being characterized by the fact that said substrate tube is a composite tube further comprising a support layer surrounding said tubular substrate layer and constituted by additional silica which is not doped or which is doped differently from said substrate silica so as to present a softening temperature which is higher than the softening temperature of said substrate layer.

The present invention will be better understood from the description given below in conjunction with the accompanying figures. It should be understood that the items described and shown are given by way of non-limiting example, even when it is specified that some of the dispositions shown are preferred dispositions in the context of this invention.

When the same item is shown in two or more figures it is designated therein by the same reference symbol.

BRIEF DESCRIPTION OF THE DRAWINGS

FIG. 1 is a cross-section through a substrate tube as fabricated during a first step of a method of the invention.

FIG. 2 is a cross-section through a tubular preform made from the tube by the method from the tube.

FIG. 3 is a cross-section through a collapsed preform derived from said tubular preform. It simultaneously constitutes a cross-section on a larger scale through an optical fiber made from said collapsed preform.

FIG. 4 is a graph showing the variation in the refractive index in said fiber plotted up the Y axis as a function of distance from the axis of the fiber plotted along the X axis.

The substrate tube 2 is shown in FIG. 1. It has two surfaces, an inside surface 4 formed by the substrate layer 16 and an outside surface 6 formed by a support layer 18.

The said cladding and core layers of the preform 7 are referenced 8 and 10 in FIG. 2. The core and the optical cladding of the final optical fiber 11 are referenced 12 and 14 in FIGS. 3 and 4, with the axis of the fiber being referenced A.

Various dispositions which are preferred in the present invention and which are implemented in the method given by way of example are now described:

By doping the silica of said substrate layer 16, its refractive index is reduced relative to the refractive index of pure silica by an amount equal to not less than 80% of the refractive index reduction in the silica of said cladding layer 8.

The said doping material in said cladding layer 8 is fluorine, in said substrate layer 16 it is fluorine or boron oxide, with the core layer 10 and the support layer 18 being constituted by silica which is substantially pure or which is doped with boron oxide.

The thickness of said substrate layer 16 lies between one half and 125 times the thickness of said cladding layer 8, and it is preferably between 1 and 3 times said thickness.

The thickness of said support layer 18 lies between 10% and 1000% of the thickness of said substrate layer 16, and it is preferably between 50% and 200%.

The fiber 11 obtained by this method is shown in FIG. 3. Like known fibers, it comprises:

a core 12 derived from said core layer 10 and having a high refractive index;

optical cladding 14 derived from said cladding layer 8 and having a low refractive index; and a coating layer 20 derived from said substrate layer 16.

In a preferred disposition resulting from the method, the fiber also comprises an additional layer 22 derived from the support layer 18 and having a high refractive index whereas the coating layer has a low index close to that of the cladding 14.

FIG. 3 also shows the collapsed preform 11A with the additional layer 22A, the collapsed substrate layer 20A, the collapsed cladding layer 14A, and the preform core 12A.

By using a support layer 23, it is possible to avoid the difficulties which would otherwise result from the fact that the softening temperature of the substrate layer 16 is about 100° C. lower than that of non-doped silica, i.e.:

a) difficulties in fabricating the preform such as deformation that occurs during the operations of depositing the cladding layer and the core layer; and b) the appearance of stretching stresses in the core of the final fiber.

The thicknesses and the fluorine mass concentrations may be approximately as follows:

support layer: 1 mm and 0%
substrate layer: 1 mm and 1%;
cladding layer: 1 mm and 1%
core layer: 40 micrometers and less than 0.1%.

The composite substrate tube 2 may be made by internally lining a primary tube of silica containing no fluorine with a secondary tube containing fluorine, using the techniques conventionally employed in the glass-making industry, and assisted by pressure increases or decreases. It is also possible to begin with a primary tube made of silica containing fluorine and to fit a tube made of silica containing no fluorine on the outside of said primary tube.

If the only difficulty is avoiding stretching in the core of the final fiber, then the substrate tube may be constituted solely by the substrate layer and an additional layer of pure silica may be applied only after the preform has been collapsed, thereby constituting a collapsed preform with a covering similar to that of the preform 11A.

We claim:

1. A method of manufacturing an optical fiber comprising the following steps:

starting from a composite tube comprising a tubular substrate layer of silica doped with one material from the group consisting of fluorine and boron oxide, and a support layer surrounding the outer perimeter of said tubular substrate layer composed of silica that is either not doped or doped with boron oxide, said support layer having a higher softening temperature than that of said tubular substrate layer, with the thickness of said support layer being between 10% and 1000% of that of said tubular substrate layer, depositing a tubular sheath layer on the interior surface of said composite tube composed of silica doped with fluorine at a temperature approaching the softening temperature of said sheath layer, depositing a tubular core layer on said tubular sheath layer to form a tubular preform, said tubular core layer being composed of a silica that is not doped or doped less than that of said sheath layer, hot collapsing said tubular preform to form a fully collapsed preform, and heat drawing said fully collapsed preform to form said fiber.

2. The method in accordance with claim 1, wherein the thickness of said support layer is between 50% and 200% of that of said substrate layer.

3. The method in accordance with claim 1, wherein the doping of said substrate layer silica and that of said sheath layer silica are such that the decrease in the index refraction of said substrate in relation to that of pure silica is equal to at least 80% of the decrease in the index of refraction of said sheath layer in relation to that of pure silica.

4. The method in accordance with claim 1, wherein the thickness of said substrate layer is between one-half and one hundred and twenty-five times that of said sheath layer.

* * * * *